Apr. 17, 1923.                                                              1,452,475
R. SARDESON
METHOD OF RELINING MOTOR VEHICLE BRAKE BANDS
Filed Nov. 25, 1921                              2 Sheets-Sheet 1
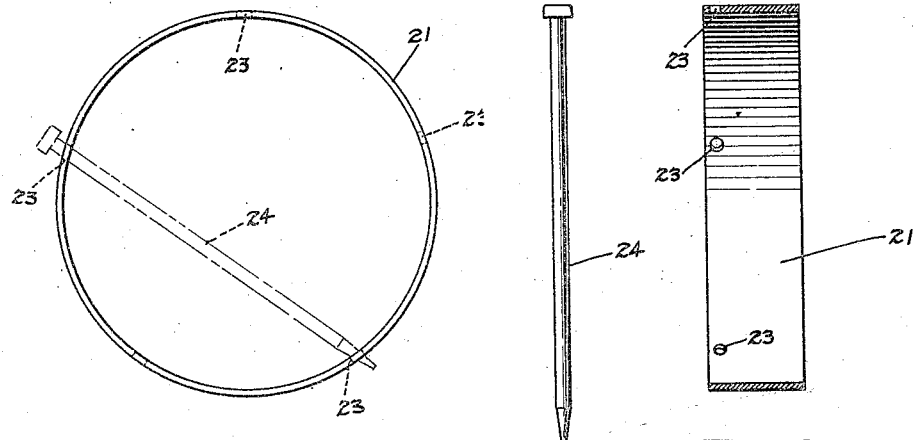
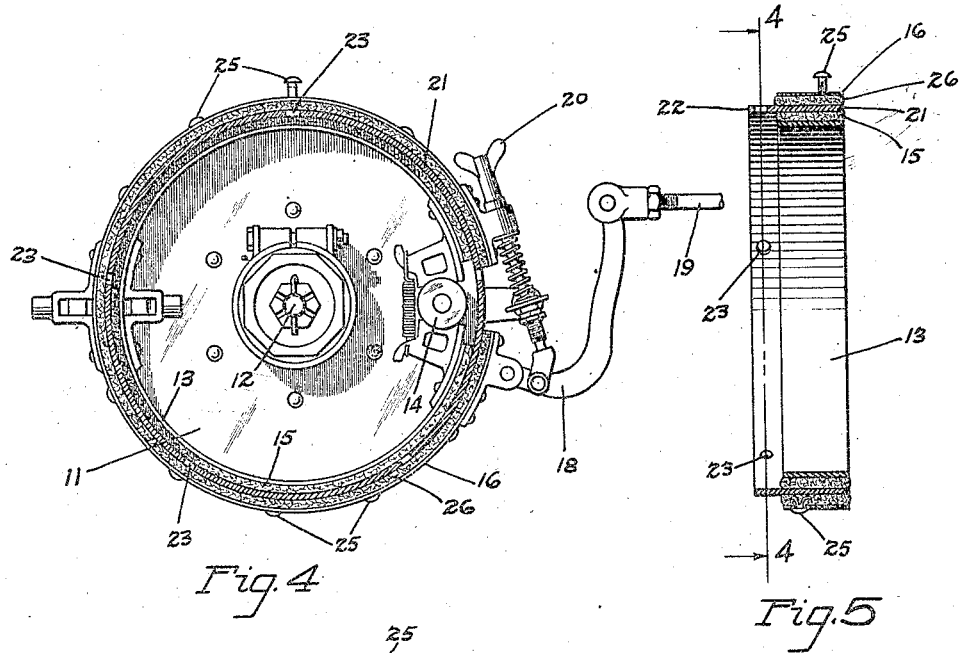
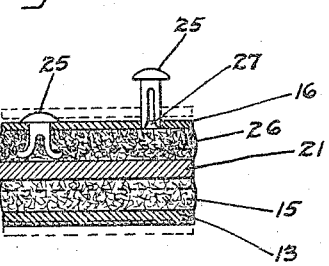
INVENTOR
Robert Sardeson
BY Paul & Paul
ATTORNEY Apr. 17, 1923.  
R. SARDESON  
METHOD OF RELINING MOTOR VEHICLE BRAKE BANDS  
Filed Nov. 25, 1921

INVENTOR  
Robert Sardeson  
BY Paulo Paul  
ATTORNEY

Patented Apr. 17, 1923.

1,452,475

UNITED STATES PATENT OFFICE.

ROBERT SARDESON, OF MINNEAPOLIS, MINNESOTA.

METHOD OF RELINING MOTOR-VEHICLE BRAKE BANDS.

Application filed November 25, 1921. Serial No. 517,728.

*To all whom it may concern:*

Be it known that I, ROBERT SARDESON, a citizen of the United States, residing at Minneapolis, county of Hennepin, in the State of Minnesota, have invented certain new and useful Improvements in Methods of Relining Motor-Vehicle Brake Bands, of which the following is a specification.

This invention relates to new and useful improvements in a method or process of relining motor vehicle brake-bands. The present method of relining brake-bands is laborious and tedious and involves a relatively high labor charge. In such relining operation as at present effected, the rear axle of the car is jacked up and the rear wheels are removed at which time the brake drums (fixed to the rear wheels) are also removed. The entire brake mechanism is thus exposed. The actuating levers must next be loosened and disconnected and the brake-bands removed. Usually these are caked with mud and grease and the connections are rusted and hard to take apart. Similarly, if the emergency brakes are also to be relined, their brake shoes must be removed in a like manner. The next step is to remove the old or worn brake lining from the band—usually by placing each band in a vise and the old rivets are cut or chiseled away and upon removal of the lining the holes in the band are cleared by a punch. The new lining is then fitted and clamped to the band and the band is used as a template for drilling holes. New rivets are then inserted in the alined band and lining holes and hammered against an anvil or metal surface whereby the rivet ends are flattened. The same method applies for both internal expanding bands such as are employed in practically all cars for emergency brakes and for external contracting bands employed for a service brake.

After relining of the band is effected, the brake-band must be replaced and thereafter the brake mechanism must be re-connected and adjusted and thereafter the rear wheels and brake drums are replaced. The present process consumes a large amount of the mechanic's time and involves a relatively large charge therefor.

By the employment of my novel process, the labor charge is practically cut in half. In practicing my invention in the majority of cases, the rear wheels and brake-drums are removed, the old lining cut away from the brake band without removal of such band from its mounting. An anvil is then inserted, for example, between the service brake-band and the lined emergency brake-band, the new lining is then inserted between the service brake-band and the anvil and is riveted to the service brake-band. The anvil is then removed and the wheels and brake drum replaced.

The object therefore of this invention is to provide a new and improved method of relining motor vehicle brake-bands.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown, as various changes may be made within the scope of the claims which follow.

In the drawings:

Figure 1 is a view in side elevation of a form of ring or anvil;

Figure 2 is a vertical section of the ring shown in Figure 1;

Figure 3 is a view in side elevation of a pin employed to facilitate handling of the ring or anvil;

Figure 4 is a view in side elevation of a common form of internal and external brake mechanism after removal of a rear wheel and drum, the novel ring or anvil being here shown in section and in operative position;

Figure 5 is a view in vertical section of the assembled mechanism but with the associated parts shown in Figure 4 omitted;

Figure 6 is an enlarged detail of a portion of the sectional view shown in Figure 5;

Figure 7:
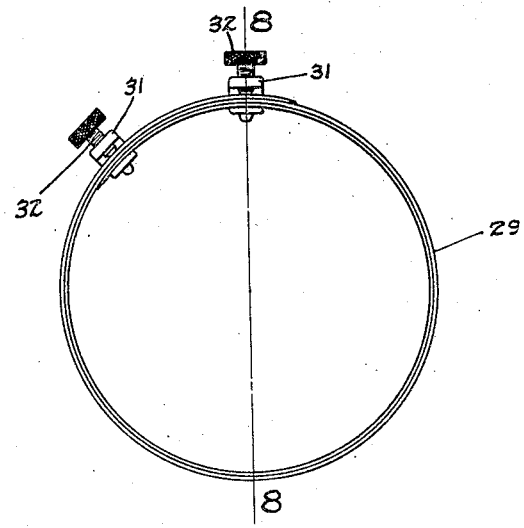
Figure 7 is a view in side elevation of a form of adjustable anvil.

For the purpose of clearness and definiteness in explaining this invention there is shown in the accompanying drawings a common form of brake mechanism, it being preferably shown after removal of a rear wheel and its brake drum in any of the well-known manners. The annular plate 11 is fixed to the rear axle housing as is usual and is stationary with respect thereto. The axle 12 for a rear wheel projects therethrough in accordance with standard practice. The mounting of the emergency internal expanding brake-band 13 and its connection 14 with an emergency brake rod (not shown) is old so far as the inventor hereof is concerned and is hereby expressly disclaimed. Such brake-band 13 is provided, as is common, with a lining 15 adapted to be frictionally held against the internal face of the usual brake-drum (not necessary to be shown). Likewise, it is old in this art to provide a service external contracting brake-band 16 having a lining suitably mounted and having a connection 18 with the usual service or foot brake rod 19.

The novel anvil employed in carrying out my process consists of a flat ring or anvil 21 preferably of substantially rigid metal. This ring is of an effective diameter equal to that of the brake-drum of the rear wheel with which the brake-bands in question are associated and is preferably greater in width than the width of the brake-band with which it is adapted to be used. When the closed flat ring 21 is employed in this process there are provided a plurality or set of such rings of varying diameters to be selectively used in connection with differently sized brake mechanisms of the present various makes of motor vehicles. The portion 22 (see Figure 5) of the ring which may be termed the projecting portion is preferably provided with a plurality of holes 23 therethrough, such holes being disposed adjacent the projecting side of the ring. Such holes 23 are adapted to receive the pin 24 by means of which the ring may be conveniently manipulated.

This novel method or process is equally applicable to relining either the external brake-band or the internal brake-band. It will be described and explained in connection with the relining of the external brake-band. In carrying out this novel process, the rear wheel and attached brake drum are removed in the usual manner. But the present demounting of the brake-band connections is not carried out. Instead, after removal of the wheel and brake drum, the old rivets which secure the old lining to the brake-band are cut away, as for example, by means of a chisel and hammer and the old lining is then easily removed from the external brake-band while the latter remains substantially in its normal position in the vehicle. The ring or anvil 21 is then inserted between the lining 15 of the internal brake-band 13 and the external brake-band 16 and the pin 24 may, if desired, be inserted in one or two holes 23 of the ring 21 to facilitate handling of the anvil. The new lining, which has been previously cut to proper length, is then inserted between the external brake-band 16 and the ring 21. Manifestly the lining may be positioned before the anvil. If preferred, before inserting the lining it may be desirable to loosen the brake-band adjustment to increase the effective diameter of the brake-band. This is conveniently effected by rotating the usual adjusting wing nut 20. After insertion of the new lining, the external brake-band is tightened snugly by any convenient means, the purpose being to hold the brake-lining firmly in place during the next step which consists in securing the new lining to the brake-band. New rivets 25 are then inserted in the usual holes provided in the external brake-band and are inwardly driven through the new lining 26 and, striking against the ring or anvil 21, are bent or deflected tightly to grip the new lining and to secure the same to the external brake-band. Preferably, brass rivets of the split type shown in Figures 5 and 6 are employed. In Figure 5, there is shown a rivet 25 about to be driven through the usual hole 27 in the external brake-band 16 and through the new lining 26 against the ring 21 whereby the split ends of the rivet are deflected in both directions as shown on the left in this figure.

The next step, after thus securing the new lining to the brake-band, is to remove the ring or anvil 21 from its operative position. This is conveniently done by loosening the brake-band which had been preferably previously tightened. The pin 24 may be employed in the manner above-mentioned to facilitate removal of the anvil. The band is thus ready for replacement of the brake drum and wheel.

It may be noted that a separate anvil need not necessarily be employed as the usual brake-drum attached to a rear wheel may be so used in carrying out this novel process. Present types of rear-wheels have removable brake-drums and, upon separation from its wheel, such drum may be used as the anvil. This is undesirable and often impracticable as there is usually great difficulty in such separation due to the fact that the bolts securing the drum to the rear wheel are usually terminally upset over the holding nuts. However, in the case of the present commercial form of wire wheel construction the brake-drum is separate from the rear wheel and may be employed as the anvil in carrying out this process.

Figure 9:
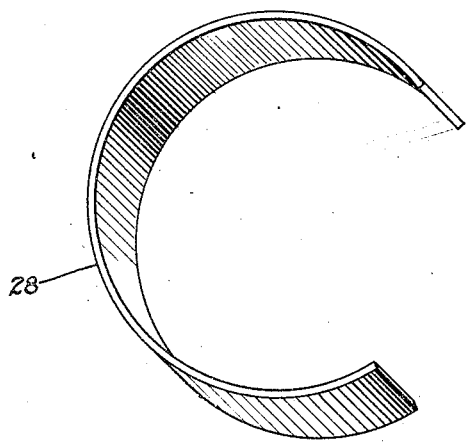
Figure 9 is a perspective view of a modified form of anvil.

An advantageous form of anvil is shown in Figure 9 wherein there is suggested the employment of an arcuately shaped anvil 28 or, otherwise considered, a flat ring having an arcuate portion thereof cut away. Such arcuate anvil is operatively positioned so that the spaced ends substantially coincide with the spaced ends of the brake-bands.

The advantage of this arcuate anvil is that its effective diameter may be readily varied.

Figure 8:
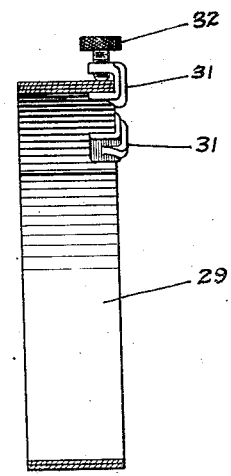
Figure 8 is a view in vertical section on the line 8—8 of Figure 7.

To avoid the necessity, above-noted, of maintaining on hand at a service station or garage a set of different diametered rings, there may be provided an adjustable ring or anvil. Such adjustable anvil 29 is shown in Figures 7 and 8 wherein is illustrated an elongated flat metallic strip shaped to provide a coiled anvil. This anvil is adapted to be held at a selected diameter by means of clamps adapted retentively to hold the two end portions of the coil with relation to each other. Any suitable clamp or small vise may be employed for this purpose. There is here shown a fixed member comprising a U-shaped metallic jaw 31 having an aperture in one portion to receive the binding screw 32 in threaded engagement therein. Rotation of the screw 32 by means of its knurled head causes the end of the screw to clamp the interposed coils of the anvil against the under flange of the jaw 31.

Thus by the employment of this process, the work attendant upon relining brake-bands of motor vehicles is greatly decreased, principally through avoidance of the necessity of demounting and replacement of the brake-bands themselves. These omitted steps are practically the most expensive due to the fact that in the majority of instances the brake mechanism parts are caked with hardened mud and with grease and the connections are rusted binding them tightly together.

Having thus described my invention what I claim as new and desire to secure by Letters-Patent, is:

1. The method of relining a motor vehicle brake-band which consists in removing the wheel, removing the old lining from the brake-band while the latter remains substantially in its normal position in the vehicle, and securing a new lining to the band while it remains substantially in said position.

2. The method of relining a motor vehicle brake-band which consists in removing the wheel and brake-drum, removing the old lining from the brake-band while the latter remains substantially in its normal position in the vehicle, and securing a new lining to the band while it remains substantially in said position.

3. The method of relining a motor vehicle brake-band which consists in removing the wheel and brake-drum, removing the old lining from the brake-band while the latter remains substantially in its normal position in the vehicle, placing a new lining in the desired relationship to said band, driving fastenings through said band and lining to secure them together while the band still remains substantially in said position, and holding an anvil in the proper position to clinch said fastenings as they are driven.

4. The method of relining a motor vehicle brake-band which consists in removing the wheel and brake-drum, removing the old lining from the brake-band while the latter remains substantially in its normal position in the vehicle, placing a new lining and an anvil adjacent the brake-band with the lining between the brake-band and anvil, driving fastenings through the band and lining and against the anvil to clinch the fastenings and secure the lining and band together while the latter still remains substantially in said position, and removing the anvil.

5. The method of re-lining the brake band of a motor vehicle which consists in removing the brake drum, removing the old lining from the brake band and re-lining it while said brake band is connected to its operating mechanism.

In witness whereof, I have hereunto set my hand this 15" day of November, 1921.

ROBERT SARDESON.